July 23, 1963 N. L. KNOPH ETAL 3,098,475
LONG WIRE STONE SAWING APPARATUS
Filed Jan. 31, 1961 3 Sheets-Sheet 1
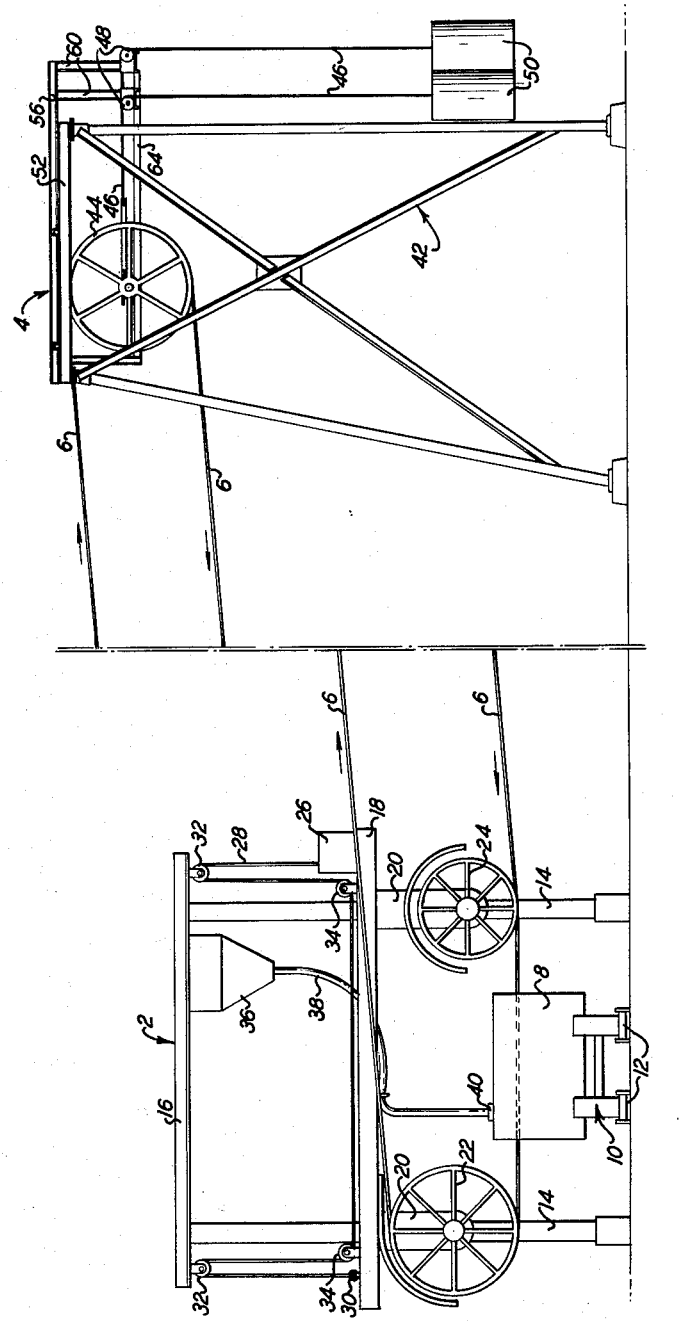
INVENTORS
NIC L. KNOPH
RALPH E. SONNELAND
BY *Swecker + Mathis*
ATTORNEYS

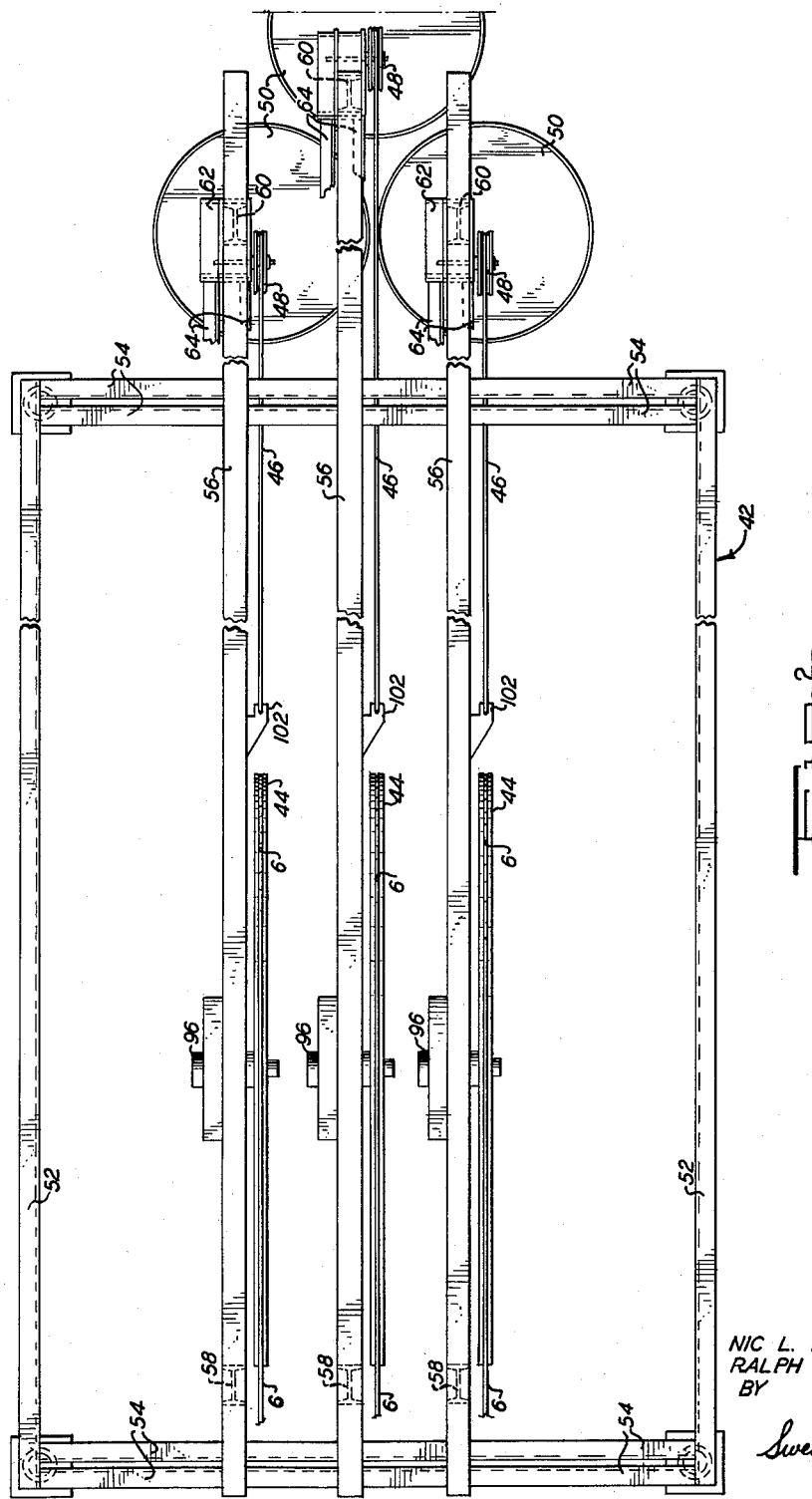

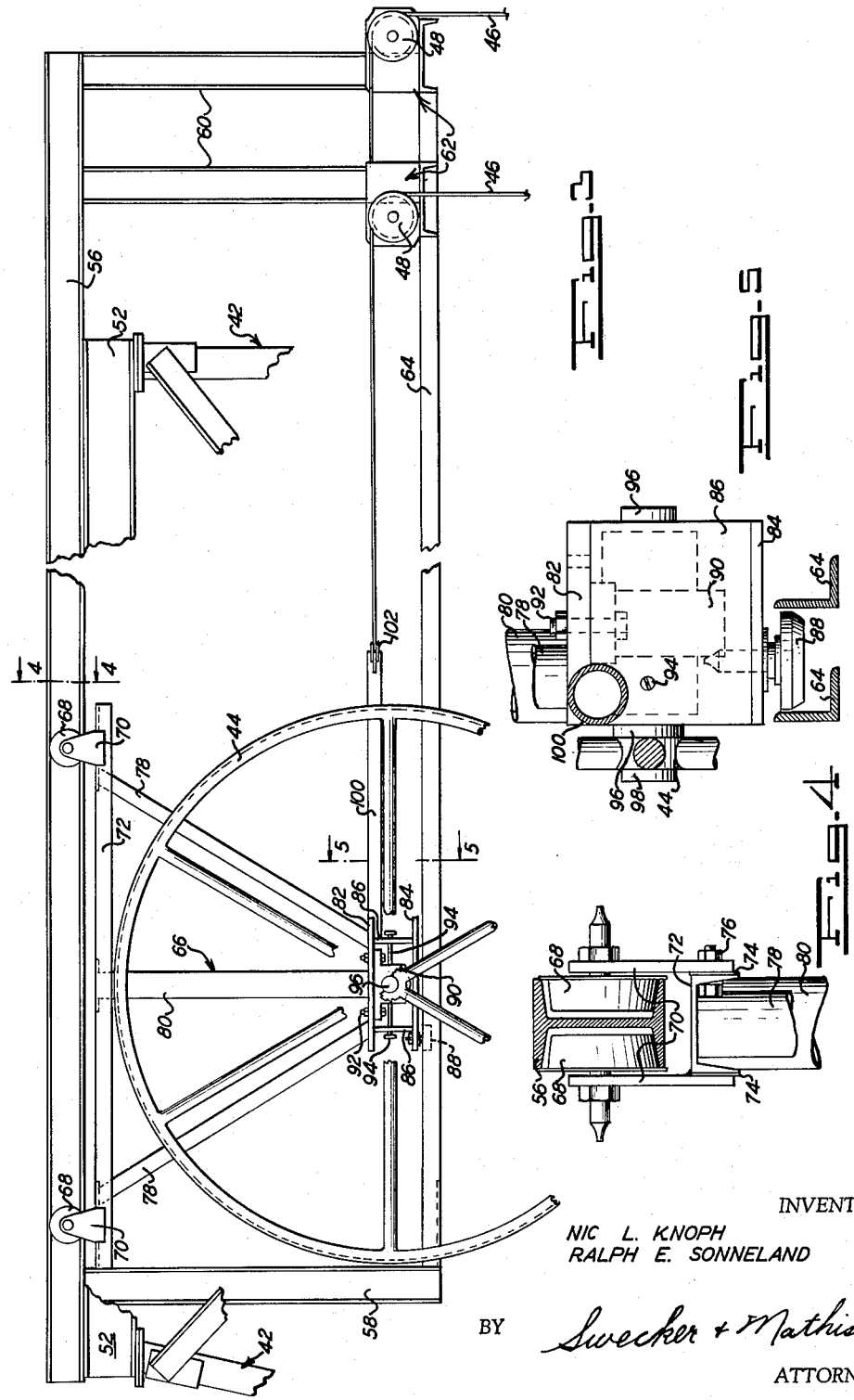

3,098,475
LONG WIRE STONE SAWING APPARATUS
Nic L. Knoph and Ralph E. Sonneland, Knoxville, Tenn., assignors, by mesne assignments, to Tysaman Machine Company, Inc., Knoxville, Tenn., a corporation of Delaware
Filed Jan. 31, 1961, Ser. No. 86,052
4 Claims. (Cl. 125—21)

This invention relates to long wire stone sawing apparatus and more particularly to a novel take-up for a stone saw of the long wire type.

A wire saw of the type with which the present invention is concerned includes a cutting station, a wire take-up station remote from the cutting station and a long saw wire driven along an endless path extending between the two stations. At the cutting station, the saw wire is guided along a cutting run over which it passes in contact with the stone to be cut. It is usual to apply a mixture of liquid and abrasive particles to the stone along the line of contact between the saw wire and the stone, and the saw wire moves the abrasive particles relative to the stone. As the abrading proceeds, a kerf is formed, and the cutting run of the saw wire is moved bodily through the stone.

The saw wires used in these saws are subject to considerable wear. The outside diameter of a new wire may be as much as twice the outside diameter of a wire that has been worn approximately to the breaking point. Moreover, as the diameter of a saw wire changes during use, the width of the kerf produced in the stone being severed also will change. Thus, the kerf produced by a wire that has been worn to the breaking point is too narrow to permit the insertion therein of a new saw wire.

This has given rise to considerable difficulty when a wire breaks during a stone severing operation. It is not feasible to substitute a new cutting wire for the broken one, and the wire saw take-ups known heretofore were so constructed that it was necessary to splice the broken saw wire while the wire was looped around the take-up.

It is an object of this invention to provide a wire saw of the long wire type with a take-up station so constructed that a broken wire may be spliced while free of tension and then looped about a take-up wheel after the splicing operation has been completed.

A more specific object of this invention is to provide a long wire stone saw with a take-up station having a take-up wheel mounted thereon so as to leave one side of the wheel unobstructed. A loop portion of the saw wire may be threaded onto the take-up wheel simply by moving the loop rearwardly along the unobstructed face of the wheel to bring the loop in position with respect to the periphery of the wheel.

Another object of the invention is to provide the take-up station of a long wire stone saw with a cantilever mounting for a take-up wheel and a longitudinally movable wheel carriage constructed and mounted to resist any tendency to twist by reason of the cantilever mounting of the wheel.

In a preferred embodiment of the invention, the take-up wheel for each saw wire is connected to a shaft that extends laterally therefrom in one direction only. The laterally extending portion of the wheel shaft is supported in a bearing fixed rigidly to a longitudinally reciprocable carriage mounted on a tower. Neither the carriage nor the tower includes any structural component disposed in front of the take-up wheel at a position that would cause interference with the looping of an endless saw wire over the periphery of the take-up wheel.

The carriage for each saw wire is suspended from overhead tracks on the tower by pairs of trolley wheels mounted on the upper end of the carriage. It is guided at its lower end by another guide wheel mounted for rotation about a vertical axis and protruding downwardly from the carriage into position for cooperation with stationary guides rigidly mounted on the tower. The construction is such that the carriage may move freely back and forth along the framework of the tower without binding and without permitting excessive inclination of the take-up wheel.

The carriage is biased rearwardly by a weight suspended from a cable passing over a stationary sheave on the tower and forwardly to the carriage. The connection between the cable and the carriage is such that the line of pull of the cable is substantially coincident with the line of pull of the saw wire looped over the periphery of the take-up wheel. This arrangement tends to balance the pull of the saw wire and to minimize twisting.

A more complete understanding of the invention and its many advantages will be gained from a consideration of the following detailed description of an embodiment illustrated in the accompanying drawings, in which:

FIG. 1 is an elevational view of a stone saw of the long wire type having the present invention applied thereto;

FIG. 2 is a plan view of the take-up station of the wire saw installation of FIG. 1;

FIG. 3 is a side elevational view of the upper end portion of the take-up station of FIG. 1 with the saw wire removed;

FIG. 4 is a detail sectional view taken along the line 4—4 in FIG. 3; and

FIG. 5 is a detail sectional view taken along the line 5—5 in FIG. 3.

The stone sawing apparatus depicted in FIG. 1 includes a cutting station 2 and a take-up station 4. The take-up station 4 may be spaced from the cutting station 2 a distance of one hundred feet or more, and long endless saw wires 6 extend between the two stations. Although this general type of installation is well known, a brief explanation of the structural features and mode of operation may be helpful to a complete understanding of the present invention.

In FIG. 1, a block 8 of stone or other material being cut is shown in position upon a carriage 10 which may be moved along tracks or guides 12 extending transversely of the machine. The carriage 10 normally is held stationary during cutting operations, but it may be moved along the tracks 12 before or after a cutting operation to facilitate the handling and positioning of the stone 8.

Disposed on opposite sides of the carriage 10 are rigid uprights 14 which extend upwardly substantial distances above the block of stone 8 and are connected together at their upper ends by a beam 16 to form a stationary frame. This stationary frame serves both to support and to guide a vertically movable frame comprising a horizontal platform 18. Depending from the platform 18 at locations on opposite sides of the carriage 10 are brackets 20 upon which rotatable wire-carrying wheels 22 and 24 are mounted. The movable frame also carries a motor (not illustrated) for driving the wheel 22 and suitable feed means for controlling the vehical movements of the movable frame.

As illustrated, the feed means includes a cable winding device 26 which cooperates with a cable 28 fixed at one end to the platform 18 by a fitting 30 and passing over the guides 32 and 34 attached, respectively, to the cross beam 16 of the stationary frame and to the platform 18. When the winding device 26 is actuated in one direction, the cable 28 is wound onto the cable winding device. This results in a decrease in the length of the portion of the cable 28 extending from the device 26 to the fitting 30 so that the movable frame must move upwardly. Similarly, when the winding device 26 is reversed, the cable 28 is unwound, and the movable frame moves downwardly under the influence of gravity.

Although only one saw wire 6 is shown in FIG. 1, it is customary in machines of this type to utilize a plurality of wires travelling in parallel paths. Other views in the drawings depict three such wires. Each wire 6 passes to the cutting station 2 along a line that brings it into contact with the lower portion of the periphery of the hold-down wheel 24. It then moves along an approximately horizontal cutting run, where it contacts the stone 8 being severed, and passes around a portion of the periphery of the drive wheel 22.

In the wire saws in use today, the actual cutting of the stone is accomplished by feeding a mixture of water and particulate abrasive to the cutting runs of the wires 6. The wires themselves are twisted structures having a number of inclined surfaces that engage the abrasive particles and rub them against the stone to effect the severing.

In FIG. 1, the abrasive mixture is fed from a suitable supply chamber 36 through a flexible conduit 38 to a distribution block 40 attached to the upper face of the stone 8. In this connection, it will be understood that there may be as many conduits 38 and distribution blocks 40 as there are cutting runs of the wires 6. Each block 40 is positioned immediately adjacent to the plane of movement of a cutting run of a wire 6, and feeds abrasive directly into the cut being formed thereby. As the depths of the cuts in the stone 8 increase, the movable frame carrying the wire-guiding wheels 22 and 24 moves downwardly so that the cutting runs of the wires 6 remain in contact with the bottoms of the kerfs until the stone 8 has been severed completely.

The take-up station 4 in the sawing apparatus of FIG. 1 includes a tower 42 upon which are supported longitudinally movable carriages that serve to mount rotatable take-up wheels 44 for the several saw wires 6. Each of the carriages is connected to one of a plurality of flexible cables 46 each extending rearwardly over a guide pulley or sheave 48 and then downwardly to a heavy weight 50. As is customary in the trade, these weights 50 are in the form of ordinary barrels filled with heavy material. The weights 50 provide a rearward bias to the take-up wheels 44 tending to remove the slack from the long endless saw wires 6.

The present invention is concerned primarily with the mounting arrangement for the take-up wheels 44 at the top of the tower 42. This construction is illustrated in greater detail in FIGS. 2 through 5 and attention now is directed to these views.

The top of the tower 42 is open and is rectangular in outline, as illustrated in FIG. 2. It includes a frame made up of longitudinally extending side members 52 and pairs of transversely extending front and back members 54. These components are welded together and securely attached to the legs of the tower to produce a rigid stationary framework.

Positioned on top of the transversely extending members 54 are three track members 56. Each of these track members 56 is an I-beam, and each is secured to the transversely extending members 54 of the tower by welding or by other suitable means.

Rigidly secured to and depending from each of the track members 56 are front and rear frame members 58 and 60. As illustrated, these members are I-beams, but other structural shapes may be employed if desired. At their lower ends, the rear frame members 60 carry mounting structures 62 for supporting the guide sheaves 48 for the cables 46 that extend downwardly to the heavy weights 50. The front and rear vertical frame members 58 and 60 of each pair are connected at their lower ends by a pair of horizontal guides 64. These preferably are rigid angle members, as shown in FIG. 5, and they are welded in place to provide a rigid framework depending from each of the longitudinal track members 56.

A longitudinally movable carriage 66 is suspended from each of the track members 56 by two pairs of trolley wheels 68 rotatably mounted on brackets 70 extending upwardly from front and rear end portions of a channel member 72. As shown best in FIG. 4, the wheels 68 of each pair project into the open spaces on opposite sides of the vertical web portion of the I-beam 56. The necessary clearances may be provided by the insertion of spacers 74 between the vertical faces of the channel member 72 and the brackets 70. One of the brackets 70 of each pair may be welded to the channel 72, but the other bracket 70 of the pair should be detachably connected to the channel member 72 as by bolt means 76 to facilitate assembly of the parts.

Extending downwardly from the channel member 72 of each carriage are a plurality of rigid tubular struts or frame members 78 and 80, which preferably are arranged in the angular pattern shown in FIG. 3. The upper ends of the tubular members 78 and 80 are welded to the channel member 72, and their lower ends are welded to the top wall 82 of a bearing support assembly. This assembly includes also a bottom wall 84 and identical front and back walls 86.

The bottom wall 84 of the bearing support assembly has mounted thereon a depending trolley wheel 88 (FIGS. 3 and 5) disposed in position to cooperate with the adjacent vertical faces of the longitudinal guides 64 on the stationary framework. Thus, it is seen that each of the carriages 66 is restrained against lateral movements at both its upper and its lower ends.

A bearing housing 90 is mounted upon and held in position with respect to each of the bearing support assemblies by means of bolts 92 and set screws 94. This bearing housing 90 rotatably supports a shaft 96 that extends laterally from the carriage far enough to permit the attachment thereto of a hub portion 98 of a take-up wheel 44.

It will be observed that the construction of the take-up station 4 of this invention is such as to permit free and unobstructed access to one face of each of the take-up wheels 44 so that a loop portion of a saw wire 6 may be brought into position about the periphery of a wheel 44 without disassembling the structure. The transversely extending frame members 54 of the tower 42 are located at a level above the tops of the take-up wheels 44; the guide structures depending on the several track members 56 include no parts located directly in front of the wheels 44; and the shafts 96 for the take-up wheels 44 are each supported at one end only.

Extending rearwardly from the rear wall 86 of each of the bearing support assemblies is a tubular member 100 of such length that its rear end is located behind the periphery of the adjacent take-up wheel 44. The tubular member 100 may be welded or otherwise rigidly secured to the bearing support assembly, and at its end it carries a laterally projecting fitting 102 by which one of the cables 46 may be connected to the carriage 66. As shown in FIG. 2, the line of pull of each cable 46 is coincident with the center line of the periphery of the take-up wheel 44 with which it is associated. This arrangement is particularly advantageous in that it serves to minimize unbalanced twisting forces on the carriages 66.

The manner in which the stone cutting apparatus of this invention may be utilized will be apparent from the foregoing description. In setting up the equipment for cutting operations, long saw wires 6 are spliced to form endless loops that may be passed about the wheels 22 and 24 at the cutting station 2 and about the take-up wheels 44 at the take-up station 4. After the loops have been applied to the peripheries of these various wheels 22, 24 and 44, the weights 50 are applied to take up the slack and tension the saw wires 6. Then cutting operations may proceed until a saw wire 6 breaks or is worn out.

When a saw wire 6 breaks, it usually is not feasible to replace it immediately with a new saw wire. This is so because the wires 6 decrease substantially in diameter during use, and a worn saw wire 6 will produce a cut or kerf in the stone 8 that is too narrow to permit the insertion of a full size, new saw wire. Therefore, in order to complete the cutting operation in progress at the time of the break, it usually is desirable to splice the broken saw wire 6 and continue with this spliced saw wire at least until the cut has been completed. This operation can be carried out quite simply with the take-up of the present invention, because it is possible to splice the broken ends of a saw wire 6 before the saw wire is threaded over the periphery of its take-up wheel 44 and while the wire is free from tensioning forces. This has not been possible with the structures known heretofore.

Although a single embodiment of the invention has been illustrated and described in detail, various changes and modifications will suggest themselves to persons skilled in the art. It is intended therefore that the foregoing description be considered as exemplary only and that the scope of the invention be ascertained from the following claims.

We claim:

1. In a stone cutting saw of the long wire type having a cutting station, a remotely located wire take-up station and an endless saw wire extending between said stations, the improvement which comprises a stationary frame at the wire take-up station including a track, a carriage suspended from said track for longitudinal movement thereon, first guide means depending from said carriage to prevent lateral movement thereof, a shaft mounted on said carriage and protruding laterally from one side of said carriage, a rotatable take-up wheel mounted on the laterally protruding portion of said shaft so as to leave one side of the wheel unobstructed to permit a loop portion of the saw wire to be positioned on the periphery of said wheel, cable means connected to said carriage on the same side as said take-up wheel and extending rearwardly therefrom along a path directly in line with the periphery of said take-up wheel, second guide means supported on said frame and positioned in a plane common with said take-up wheel and means for urging said cable means and said carriage rearwardly to take up slack in the saw wire looped around the take-up wheel.

2. In a stone cutting saw of the long wire type having a cutting station, a remotely located wire take-up station and an endless saw wire extending between said stations, the improvement which comprises a stationary tower at the wire take-up station having longitudinally and transversely extending structural members at the top thereof rigidly connected together to provide an open rectangular frame, a longitudinal I-beam fixed rigidly to the transversely extending structural members between the longitudinally extending members of said frame with its central web disposed in a vertical plane, a longitudinally movable carriage depending from said I-beam, said carriage including a first pair of trolley wheels thereon near its front end and projecting into the open sides of said I-beam and including a second pair of trolley wheels thereon near its rear end and projecting into the open sides of said I-beam, another trolley wheel at the bottom of said carriage mounted for rotation about a vertical axis, vertical members fixed rigidly to the end portions of said I-beam and extending downwardly therefrom, longitudinal guide means fixed to the vertical members in position to cooperate with the last-mentioned trolley wheel to prevent lateral movements of the lower end of the carriage, a take-up wheel around which the saw wire is looped, means rotatably mounting said take-up wheel on said carriage at one side of the carriage so that one side of the take-up wheel is unobstructed, and means for urging said carriage rearwardly to take up slack in the saw wire looped around the take-up wheel.

3. In a stone cutting saw of the long wire type having a cutting station, a remotely located wire take-up station and an endless saw wire extending between said stations, the improvement which comprises a stationary tower at the wire take-up station having longitudinally and transversely extending structural members at the top thereof rigidly connected together to provide an open rectangular frame, a longitudinal I-beam fixed rigidly to the transversely extending structural members between the longitudinally extending members of said frame with its central web disposed in a vertical plane, a longitudinally movable carriage depending from said I-beam, said carriage including a first pair of trolley wheels thereon near its front end and projecting into the open sides of said I-beam and including a second pair of trolley wheels thereon near its rear end and projecting into the open sides of said I-beam, another trolley wheel at the bottom of said carriage mounted for rotation about a vertical axis, vertical members fixed rigidly to the end portions of said I-beam and extending downwardly therefrom, longitudinal guide means fixed to the vertical members in position to cooperate wtih the last-mentioned trolley wheel to prevent lateral movements of the lower end of the carriage, a horizontal shaft mounted on the lower end portion of the carriage and protruding laterally from one side of the carriage, a rotatable take-up wheel mounted on the laterally protruding portion of said shaft so as to leave access to one face of the take-up wheel unobstructed, said take-up wheel being of a diameter such that its upper surface is disposed below said rectangular frame, and means for urging said carriage rearwardly to take up slack in the saw wire looped around the take-up wheel.

4. In a stone cutting saw of the long wire type having a cutting station, a remotely located wire take-up station and an endless saw wire extending between said stations, the improvement which comprises a longitudinally movable carriage depending from said track, a pair of trolley wheels at each end of said carriage operatively associated with said track, another trolley wheel at the bottom of said carriage mounted for rotation about an upright axis, members fixed to the end portions of said track and extending downwardly therefrom, elongated guide means affixed to said members in position to cooperate with the last-mentioned trolley wheel to prevent lateral movements of the lower end of the carriage, a take-up wheel around which the saw wire is looped, means rotatably mounting said take-up wheel on said carriage, and means for urging said carriage rearwardly to take up slack in the saw wire looped around the take-up wheel.

References Cited in the file of this patent

UNITED STATES PATENTS

| | | |
|---|---|---|
| 594,542 | Knobel | Nov. 30, 1897 |
| 980,878 | Miskin | Jan. 3, 1911 |
| 1,662,488 | Burkhardt | Mar. 13, 1928 |

FOREIGN PATENTS

| | | |
|---|---|---|
| 359,817 | France | Feb. 3, 1905 |